United States Patent
Ilac et al.

(10) Patent No.: US 7,571,311 B2
(45) Date of Patent: Aug. 4, 2009

(54) SCHEME FOR SUB-REALMS WITHIN AN AUTHENTICATION PROTOCOL

(75) Inventors: Cristian Marius Ilac, Sammamish, WA (US); Karthik Jaganathan, Redmond, WA (US); Murli D. Satagopan, Sammamish, WA (US); Tarek Bahna El-Din Mahmoud Kamel, Issaquah, WA (US); Todd F. Stecher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/096,829

(22) Filed: Apr. 1, 2005

(65) Prior Publication Data
US 2006/0224891 A1    Oct. 5, 2006

(51) Int. Cl.
*H04L 9/32* (2006.01)
(52) U.S. Cl. .................. 713/155; 709/229; 380/277; 713/171
(58) Field of Classification Search ............ 713/168, 713/171; 726/2; 380/277, 278, 279, 286
See application file for complete search history.

(56) References Cited

U.S. PATENT DOCUMENTS

| 5,757,920 | A |   | 5/1998 | Misra et al. ............ 380/25 |
| 6,128,391 | A | * | 10/2000 | Denno et al. ............ 380/283 |
| 6,279,111 | B1 |  | 8/2001 | Jensenworth et al. ....... 713/200 |
| 6,427,209 | B1 |  | 7/2002 | Brezak, Jr. et al. ........ 713/201 |
| 2003/0120948 | A1 | * | 6/2003 | Schmidt et al. ........... 713/200 |

* cited by examiner

*Primary Examiner*—Gilberto Barron, Jr.
*Assistant Examiner*—Shahrouz Yousefi
(74) *Attorney, Agent, or Firm*—Woodcock Washburn LLP

(57) ABSTRACT

Branch domain controllers (DCs) contain read only replicas of the data in a normal domain DC. This includes information about the groups a user belongs to so it can be used to determine authorization information. Password information, however, is desirably replicated to the branch DCs only for users and services (including machines) designated for that particular branch. Moreover, all write operations are desirably handled by hub DCs, the primary domain controller (PDC), or other DCs trusted by the corporate office. Rapid authentication and authorization in branch offices is supported using Kerberos sub-realms in which each branch office operates as a virtual realm. The Kerberos protocol employs different key version numbers to distinguish between the virtual realms of the head and branch key distribution centers (KDCs). Accounts may be named krbtgt_<ID> where <ID> is carried in the kvno field of the ticket granting ticket (TGT) to indicate to the hub KDC which krbtgt' key was used to encrypt the TGT.

20 Claims, 7 Drawing Sheets

US 7,571,311 B2

SCHEME FOR SUB-REALMS WITHIN AN AUTHENTICATION PROTOCOL

FIELD OF THE INVENTION

This invention relates to computer systems, and more particularly to authentication and authorization of devices using a central trusted authority in distributed environments.

BACKGROUND OF THE INVENTION

Ever since the advent of digital computers, access control has been an important topic of computer security. To protect the integrity of computer systems and the confidentiality of important data, various access control schemes have been implemented to prevent unauthorized users and malicious attackers from gaining access to computer resources.

Authentication is the process of determining whether someone or something is, in fact, who or what it is declared to be. In private and public computer networks (including the Internet), authentication is commonly done through the use of usernames and passwords. Knowledge of a password is assumed to verify the user's identity. Each user registers initially, using an assigned or self-declared password. On each subsequent use, the user must know and use the previously declared password. Many institutions require a more stringent authentication process than the simple username and password approach.

An authentication protocol is a sequence of steps that is carried out in an authentication. When a client desires a connection to a server, authentication is required. An exemplary authentication protocol is Kerberos. According to the Kerberos protocol, authentication of the connection to the server is accomplished via a ticket. The ticket is initially received by the client from a ticket-issuing facility on the network known as a key distribution center (KDC). The ticket is re-useable for a period of time, whereby even if the session is terminated, the client does not have to repeat the authentication process while the ticket is still valid.

Thus, various schemes based on different protocols, such as the Kerberos protocol, have been proposed and implemented for controlling network access control by means of user authentication. Generally, the user logon for a computer and the user authentication for network access control are two separate procedures. Nevertheless, to minimize the burden on a user in dealing with the different access control schemes, the user logon and the user authentication for network access are sometimes performed together. For example, in the case where the user authentication is implemented under the Kerberos protocol, when the user logs on the computer, the computer may also initiate a Kerberos authentication process. In the authentication process, the computer contacts a Kerberos KDC to first obtain a ticket-granting ticket (TGT) for the user. The computer can then use the TGT to obtain from the KDC a session ticket for itself.

Kerberos realms are used today to support directly (e.g., Microsoft Active Directory®) authentication and authorization. A Kerberos realm is defined by a single, central authentication authority implemented by a KDC. In cases where organization structures span across large geographical areas, such as the ones employing branch offices, it is common to deploy local, synchronized instances of KDCs in order to provide quick authentication. However, this approach creates security issues as the branch offices are often located in untrusted locations.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention provides a way to mitigate the security risks associated with deploying domain controllers on branch offices while supporting rapid authentication and authorization by using Kerberos sub-realms in which each branch office operates as a virtual realm. According to an embodiment, the Kerberos protocol employs different key version numbers to distinguish between the virtual realms of the head and branch key distribution centers (KDCs).

According to aspects of the present invention, a branch ID as opposed to the realm name is used to distinguish between multiple virtual realms.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

An authentication protocol is a sequence of steps that are carried out in an authentication. Many authentication protocols have been designed to authenticate computing devices as well as applications, data, or other content.

While aspects of this invention will be described, for clarity, in an environment of discrete and remote computers, the invention can also be applied to authentication protocols in any environment, including application authentication, data authentication, user authentication, remote device authentication, process authentication, and the like. Several kinds of authentication protocols will be described herein for the purpose of introducing terms and concepts in authentication of computing processes, but this is not intended as a list of possible authentication protocols for use with the invention. It will be acknowledged that the invention can be used in conjunction with any authentication protocol.

Figure 1:
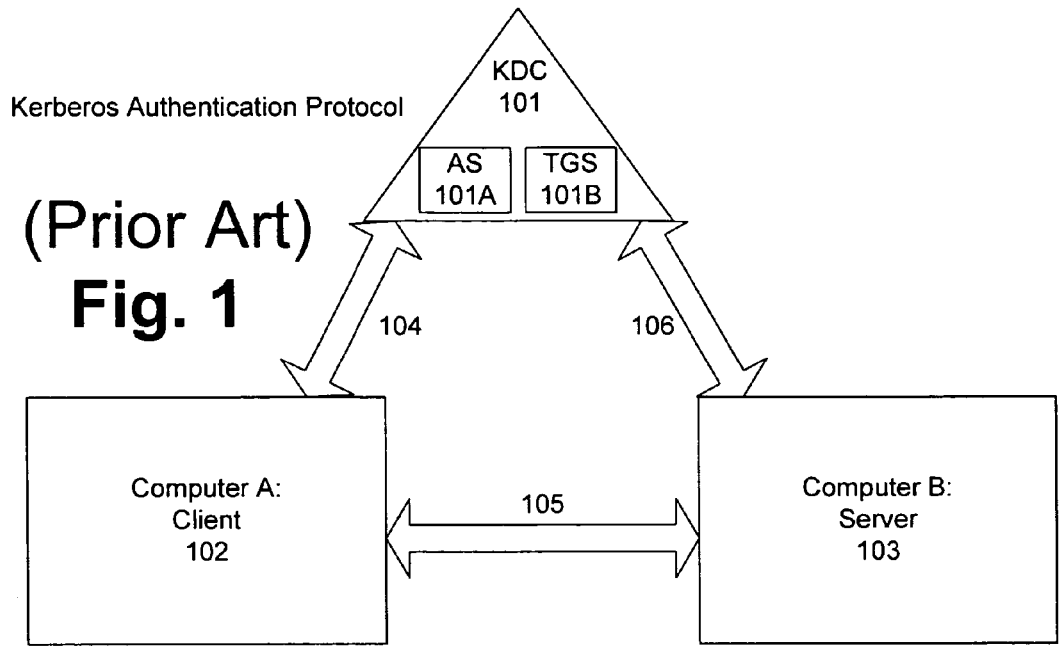
FIG. 1 is a diagram showing the three processes involved in the Kerberos authentication protocol.
Figure 2:
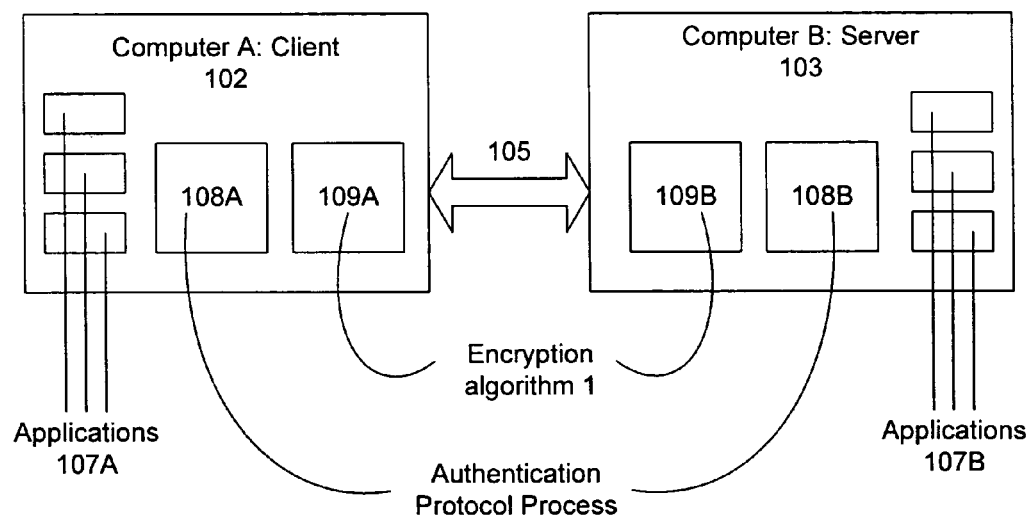
FIG. 2 is a more detailed view of the client computer and server computer involved in an authentication protocol such as Kerberos, showing various authentication processes running on the computers.

Kerberos is an authentication protocol that has experienced wide use. Kerberos was created by the Massachusetts Institute of Technology (MIT) and named for a three-headed dog that guarded the gates of the underworld in Greek mythology. FIGS. 1 and 2, and the following brief discussion, provide a conceptual illustration of Kerberos for use in conjunction with embodiments of the invention. The three headed dog symbolizes the three processes utilized by Kerberos: the client 102, the server 103, and the key distribution center (KDC) 101. The client 102 and the server 103 are sometimes referred to as "principals." The KDC may comprise an authentication server (AS) 101A and a ticket granting server (TGS) 101B.

Under the Kerberos protocol, when a client wants to establish a session with a service, it has to have a session key and a session ticket for the purpose of authenticating itself with that service. The session key and the session ticket are issued by a Kerberos KDC upon request by the client. Since the KDC is itself a service, the client has to first obtain a session key and a session ticket for transactions with the KDC before it can request for session keys and tickets for other services. This special session ticket for communicating with the KDC is called a ticket-granting ticket (TGT), and the associated session key is called a "logon session key." When the client wants to access a service other than the KDC, it sends a request, including the TGT, to the KDC for a session ticket for that service. The KDC responds to the request by issuing a session ticket for the target service to the client, which then uses the service session ticket to access the target service.

The Kerberos protocol includes three subprotocols. The subprotocol in which the KDC gives a client a logon session key and a TGT is known as the authentication service (AS) exchange. The subprotocol in which the KDC distributes a service session key and a session ticket for a requested service to the client is known as the ticket-granting service (TGS) exchange. The subprotocol in which the client presents the session ticket for admission to a service is called the application protocol (AP) exchange.

Kerberos currently employs shared private keys (symmetric encryption). The authentication process proceeds as follows, with reference to FIG. 1: A client 102 sends a request 104 to an AS 101A, requesting "credentials" for a given server 103. This request is called an authentication service request ("AS_REQ"). The AS 101A responds 104 with the requested credentials, encrypted in the client's key. The credentials consist of 1) a "ticket" for the server 103 and 2) a temporary encryption key (often called a "session key"). This response is called an authentication service reply ("AS_REP").

The client 102 transmits the ticket (which contains the client's identity and a copy of the session key, all encrypted in a private server key) to the server 103. This transmission is designated in FIG. 1 by the communication arrow 105. This transmission is called the authentication protocol request ("AP_REQ"). The session key (now shared by the client 102 and server 103) is used by the server 103 to authenticate the client 102, by decrypting the client's identity, and may optionally be used to authenticate the server 103. If the client 102 requests authentication of the server 103, thereby providing two-way authentication, the client 102 can encrypt a time stamp using the session key and transmit it to the server 103 along with the ticket. Only the server 103 will be able to decrypt the time stamp, because only the server 103 could decrypt the ticket to obtain the session key. The server 103 can then return the time stamp portion to the client 102, encrypted in the session key, thereby authenticating itself to the client 102. The server reply to the client is called the authentication protocol reply ("AP_REP").

The session key may be used to encrypt further communication between the two parties or to exchange a separate subsession key to be used to encrypt further communication. A subsession key can be any key for use in encrypting and decrypting communications between two or more computers. It is an encryption and/or decryption key that is used subsequently to a first encryption and/or decryption key.

Remaining with FIG. 1, Kerberos implementation consists of one or more authentication servers 101A running on physically secure hosts 101. The authentication servers 101A maintain a database of principals (i.e., clients 102 and servers 103) and their secret keys. Code libraries provide encryption and implement the Kerberos protocol. In order to add authentication to its transactions, a typical network application adds one or two calls to the Kerberos library, which results in the transmission of the necessary messages to achieve authentication. The Kerberos protocol consists of several sub-protocols (or exchanges). There are two methods by which a client 102 can ask a Kerberos server 101 for credentials. In the first approach, the client 102 sends a plaintext request for a ticket for the desired server 103 to the AS 101A. The reply is sent encrypted in the client's secret key. Usually this request is for a ticket-granting ticket (TGT) which can later be used with the ticket-granting server (TGS) 101B, which may also be a part of the KDC 101. In the second method, performed after the client 102 has obtained a TGT, the client 102 sends a request to the TGS 101B. The client sends the TGT to the TGS 101B in the same manner as if it were contacting any other application server which requires Kerberos credentials. The reply is encrypted in the session key from the TGT. Once obtained, credentials may be used to verify the identity of the principals in a transaction, to ensure the integrity of messages exchanged between them, or to preserve privacy of the messages. The application is free to choose whatever protection may be necessary.

To verify the identities of the principals in a transaction, the client 102 transmits the ticket to the server 103. Since the ticket is sent "in the clear" (parts of it may be encrypted, but this encryption does not thwart replay) and might be intercepted and reused by an attacker, additional information is sent to prove that the message was originated by the client 102 to whom the ticket was issued. This information (called the authenticator) is encrypted in the session key, and includes a timestamp, as mentioned above. The timestamp proves that the message was recently generated and is not a replay. Encrypting the authenticator in the session key proves that it was generated by a party possessing the session key. Since no one except the client 102 and the server 103 know the session key (it is never sent over the network in the clear) this guarantees the identity of the client 102.

The integrity of the messages exchanged between principals can also be guaranteed using the session key (passed in the ticket and contained in the credentials). This approach provides detection of both replay attacks and message modification attacks. It is accomplished by generating and transmitting a collision-proof checksum of the client's message, keyed with the session key. Privacy and integrity of the messages exchanged between principals can be secured by encrypting the data to be passed using the session key passed in the ticket, and contained in the credentials.

The authentication exchanges mentioned above are usually in the context of read-only access to the Kerberos database. Sometimes, however, the entries in the database must be modified, such as when adding new principals or changing a principal's key. This is done using a protocol between a client and yet another Kerberos server, the Kerberos Administration Server (KADM) (not shown). The administration protocol is not described in this document. There is also a protocol for maintaining multiple copies of the Kerberos database, but this can be considered an implementation detail and may vary to support different database technologies.

Authentication protocols can be used for any authentication. It is easy to imagine a computer user on a client computer authenticating himself to a server computer. A more subtle scenario is depicted in FIG. 2, namely that of one or more applications 107A running on a client computer 102 engaging an authentication protocol 108A to access desired data on a server computer 103. For example, information for a database may be distributed across several computers. A database query initiated by an application 107A on a client computer 102 may require an authentication protocol 108A, 108B to access to the various machines such as server 103. In this situation, the database application, e.g., SQL SERVER or any other database application, would make a function call for the retrieval of the desired information. This function call would be made a particular application program interface (API). An API is a language and message format used by an application program to communicate with the operating system or some other control program such as a database management system (DBMS) or communications protocol. APIs are implemented by writing function calls in an application, which provide the linkage to an indicated subroutine for execution.

In example embodiments, the network access control is provided by means based on the Kerberos protocol. Although the following description is directed mostly to embodiments based on the Kerberos protocol, it will be appreciated that the present invention is not limited thereto, and can be readily adapted for use with other authentication protocols.

The following terminology is used herein. Branch domain controllers (DCs) are DCs that are deployed in a branch office site and their physical security is not as strong as the DCs in the corporate office. As such, a compromise for a branch DC is deemed more likely. A hub DC is a DC that is set up to act as a window for the branch to communicate with the rest of the directory (e.g., Microsoft Active Directory®) (AD) infrastructure. A PDC is the primary domain controller (e.g., as established in Windows 2000 onwards.) Main DCs include the hub DCs, the PDC and, for example, other Windows 2003 and Windows 2000 DCs. Krbtgt is the account that represents the Kerberos AS service. This account has a key called the krbtgt key (or KDC key) that is used to encrypt the TGTs.

A domain controller (DC) is a single machine or computing device. A domain can include many DCs. A domain may also be known as a realm (e.g., in Kerberos). While isolation can be achieved by splitting a given domain into multiple domains, the present invention preserves the domain boundaries achieving isolation. For example, attributes in Kerberos are used to extend Kerberos to achieve isolation.

The present invention supports branch office DCs. Branch office DCs are specialized DCs meant for deployment in branch offices. These DCs can potentially be compromised without compromising all of the domain. Customers have deployed DCs in branches to make authentication more efficient. However, having DCs in a physically insecure branch compromises the integrity of the entire forest. Hence it is desirable to deploy a DC that will not have such a high level of risk.

A KDC is a service that runs on the DC. A directory service, such as Active Directory®, stores information about network-based entities, such as applications, files, printers, and people. A directory service also manages identities and brokers resources between distributed resources, e.g., manages secret information. Kerberos KDC uses this secret information. The KDC authenticates the users because it has access to the users' secrets through the directory.

In accordance with the present invention, only the appropriate secrets for a particular branch are replicated to that branch. Aspects of the present invention ensure isolation of the secrets after they have been replicated. The KDCs are made to trust each other. A field in the Kerberos tickets (not the realm name) is used to achieve isolation.

The realm name is the highest level identifier. Although distinction may be made based on realm name, it is preferable to use a "key information field", as set forth in accordance with the present invention, which contains a key encryption type and a key version number.

Figure 3:
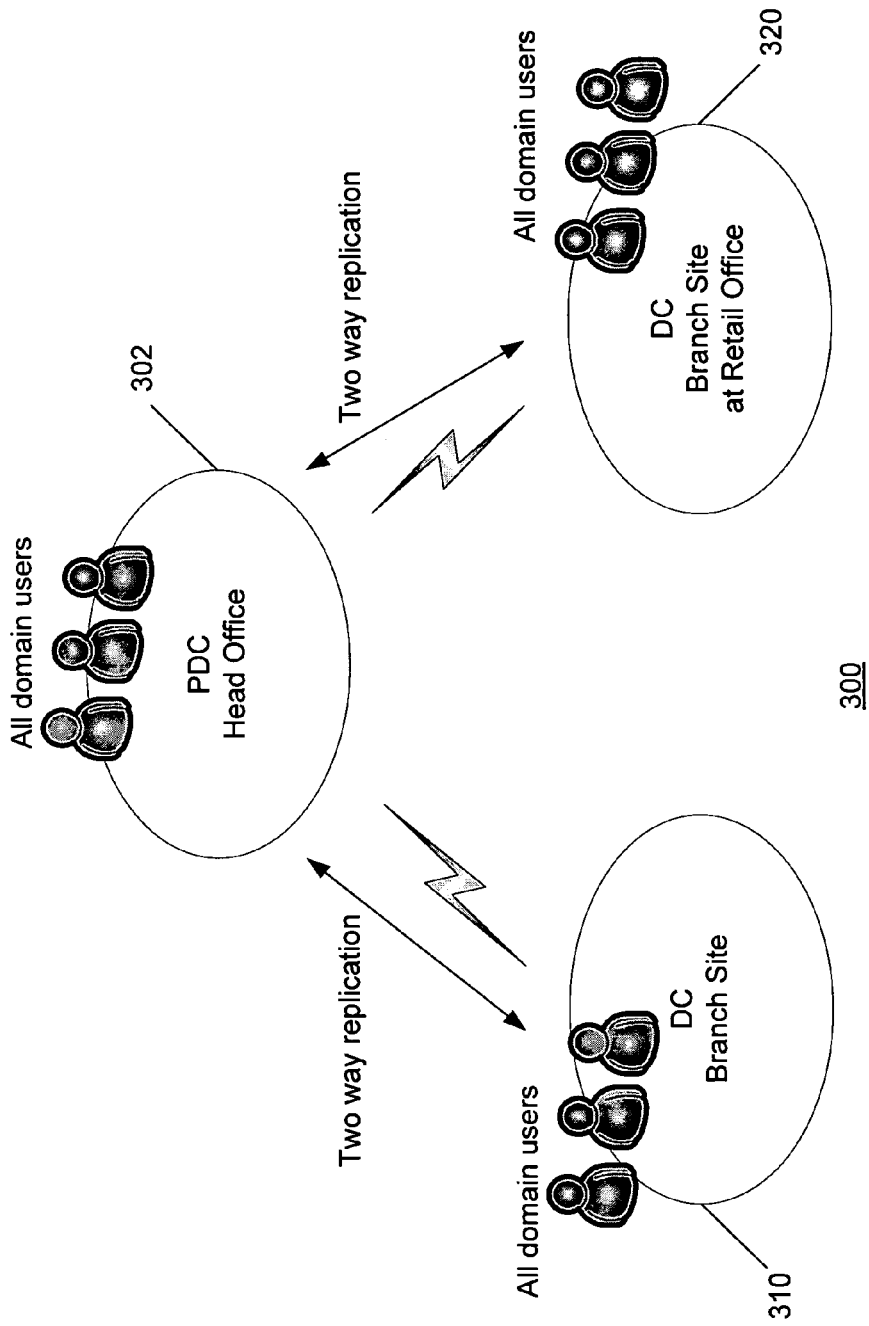
FIG. 3 shows a conventional branch office model.

FIG. 3 shows a conventional branch office model. A PDC 302 is accessible by all users in the domain 300, and acts as a head office. Branch DCs 310, 320 are shown as each in two communication (e.g., two way replication) with the PDC 300. The branch DCs 310, 320 may reside as remote sites or retail offices, for example. In this conventional model, there is no separation or isolation. Every DC has access to everything. All of each user's secrets are replicated on all the branch DCs. This is undesirable.

Figure 4:
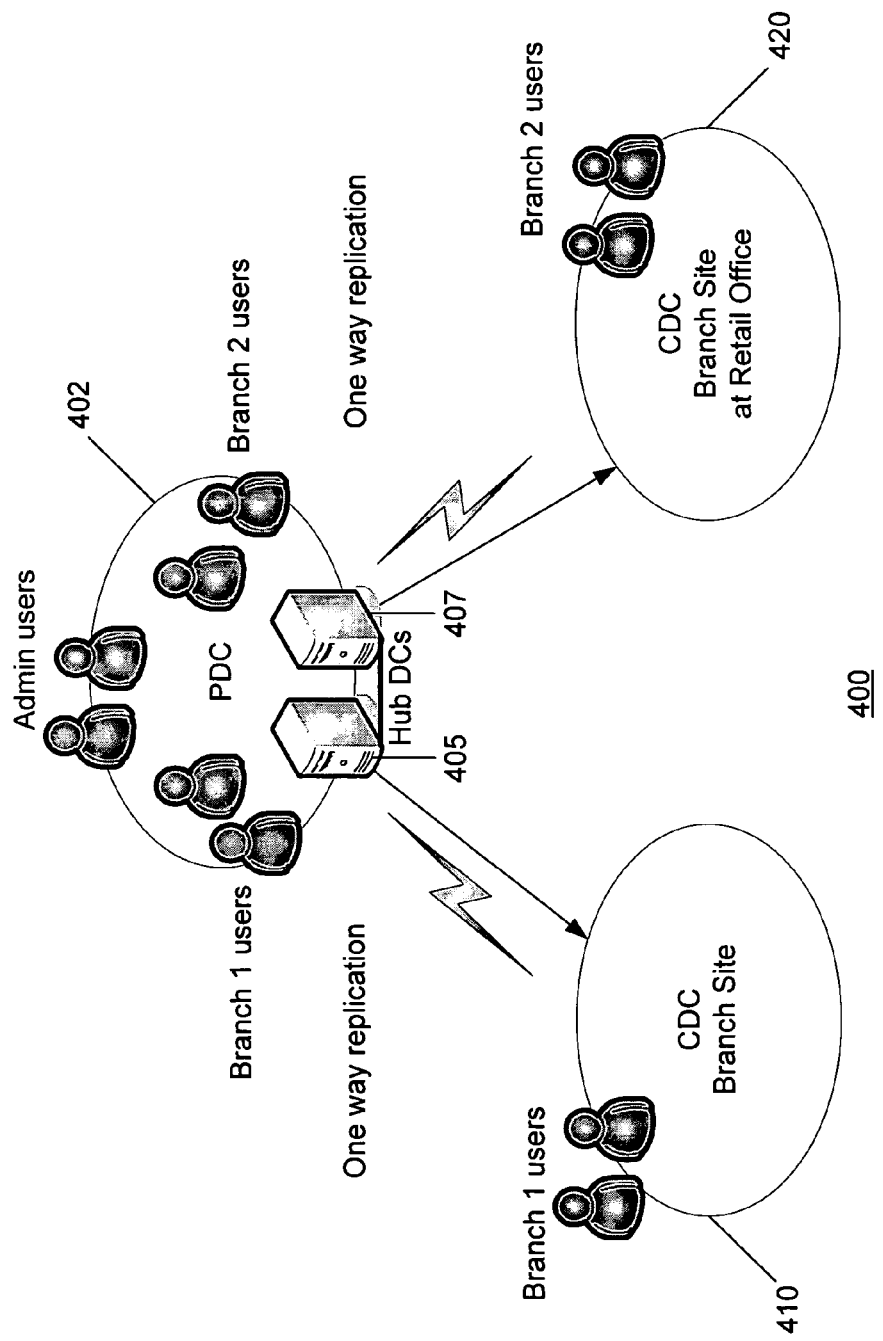
FIG. 4 show a branch office model in accordance with the present invention.

FIG. 4 shows a branch office model in accordance with the present invention. A PDC 402 in a domain 400 is shown with various groups of users (e.g., branch 1 users, branch 2 users). The PDC 400 acts as a head office with a hub DCs 405, 407. The hub DCs 405, 407 are in one way communication (e.g., one way replication) with each of the branch DCs 410, 420, respectively. Branch 1 users are associated with branch DC 410, and branch 2 users are associated with branch DC 420. Here, users are split into various groups belonging to specific branch DCs. Each user's secrets are protected by the isolation/separation. Each DC desirably has an instance of KDC and a directory such as Active Directory®.

Branch DCs 410, 420 desirably have limited privileges in the domain such that even if they are compromised they will not compromise the entire forest or domain. There are two main ways in which a branch DC may compromise the domain. One way is the injection of malicious data. Conventional branch DCs have unlimited privileges to write data. There are several ways to mitigate this including: (1) allowing branch DCs to write to only certain portions of the AD database, for example; and (2) allowing only read operations at branch DCs, such that all write operations are to be performed at the main DCs.

Another way in which a branch DC may compromise the domain is by the compromise of privileged secret information, such as user and service keys that could be used to perform privileged operations. This could be mitigated by, for example, not letting any secret information replicate to the branch DCs (this, while effective, would significantly reduce the benefits of deploying a DC in the branch); and replicating only a subset of the secrets. For example, do not replicate the secrets of users who can perform privileged operations.

In accordance with the present invention, branch DCs contain read only replicas of the data that typically resides in a DC. This includes information about the groups a user belongs to so it can be used to determine authorization information. Password information, however, is desirably replicated to the branch DCs only for users and services (including machines) designated for that particular branch. Moreover, all write operations are desirably handled by hub DCs, the PDC, or other DCs trusted by the corporate office.

Because a branch does not have all the secrets, the branch can only perform authentication operations that are limited to requiring keys that are present in the branch. For Kerberos, the branch DC can issue TGTs for branch users and service tickets for branch services. Also, branch DCs are desirably cryptographically isolated from hub DCs such that they cannot issue tickets for users and services they are not authorized for.

Authentication requests for users not belonging to the local branch are desirably forwarded by the branch DC to the hub DC. In particular, AS_REQs for users not in the branch may be forwarded to the hub DC; and TGS_REQs may be forwarded if the user requesting it is not a local user (e.g., the branch DC did not issue the TGT for this user, or if the service is not a local service).

Hub DCs may trust authentication requests performed by a branch for the users belonging to that branch but desirably recalculate the privileged attribute certificate (PAC) for such users when they access resources not at the branch.

The distinction between users authenticated by the branch and those authenticated at the hub is made by having separate keys associated with the Krbtgt accounts in the branch and the hub.

To achieve the desired secret separation, the branch DC (also referred to herein as a read only domain controller or RODC) has a cache of the user and machine account secrets that are used in the branch. The set of user and machine account secrets available at the RODC is based on partial replication according to policy. A read only copy of all other information in a DC is also kept at the branch DC and this allows the branch to supply group policy, compute authorization information, etc.

Authorization is desirably required for a given RODC to cache a given user or machine account. This may be done explicitly such that an administrator can declare that a given RODC or a given set of RODCs can cache or are denied to cache a certain set of accounts.

Each read only domain controller (RODC) or branch DC has a Kerberos key distribution center (KDC). The KDC uses a different krbtgt password than what the head office KDC uses when signing/encrypting ticket granting tickets (TGTs) (this different password is referred to herein as krbtgt'). The RODC at the branch knows only the key of the branch in question. The DCs at the head office know the key associated with the normal krbtgt account and in addition to that know the key used by each branch. In Kerberos protocol terms, this means different key version numbers for the Kerberos master keys used by the head and branch KDCs.

According to an embodiment, the accounts for the RODCs are named krbtgt_<ID>, where <ID> is a number ranging from 1 to $2^{16}$. The <ID> may be carried in a field (e.g., the kvno field) in the TGT as an indication to the hub KDC which krbtgt' key was used to encrypt the TGT. This (kvno) field may be a uint32 (32 bit field) that can be split into two words, the lower most 16 bits used for the key version number and highest most 16 bits used for the <ID>, where 0 here would be reserved for the main krbtgt. It is contemplated that a krbtgt' account may be created for each branch, and that this account can be shared between RODCs in the same branch only.

In other words, it is desirable to distinguish between claims issued by a hub KDC and a branch KDC. This distinction is made based on key version number. The key information field is 32 bits. This field is split into two 16 bit fields. One 16 bit field is used for the RODC ID, and the other 16 bit field is used for the key version. The separation of the keys is performed in a domain and implemented by the RODC ID field.

The branch DC is advertised as the KDC for the desired realm in the branch office. Branch clients will preferably find the branch DC, failing which they will try to find a head office DC (HODC).

Figure 5:
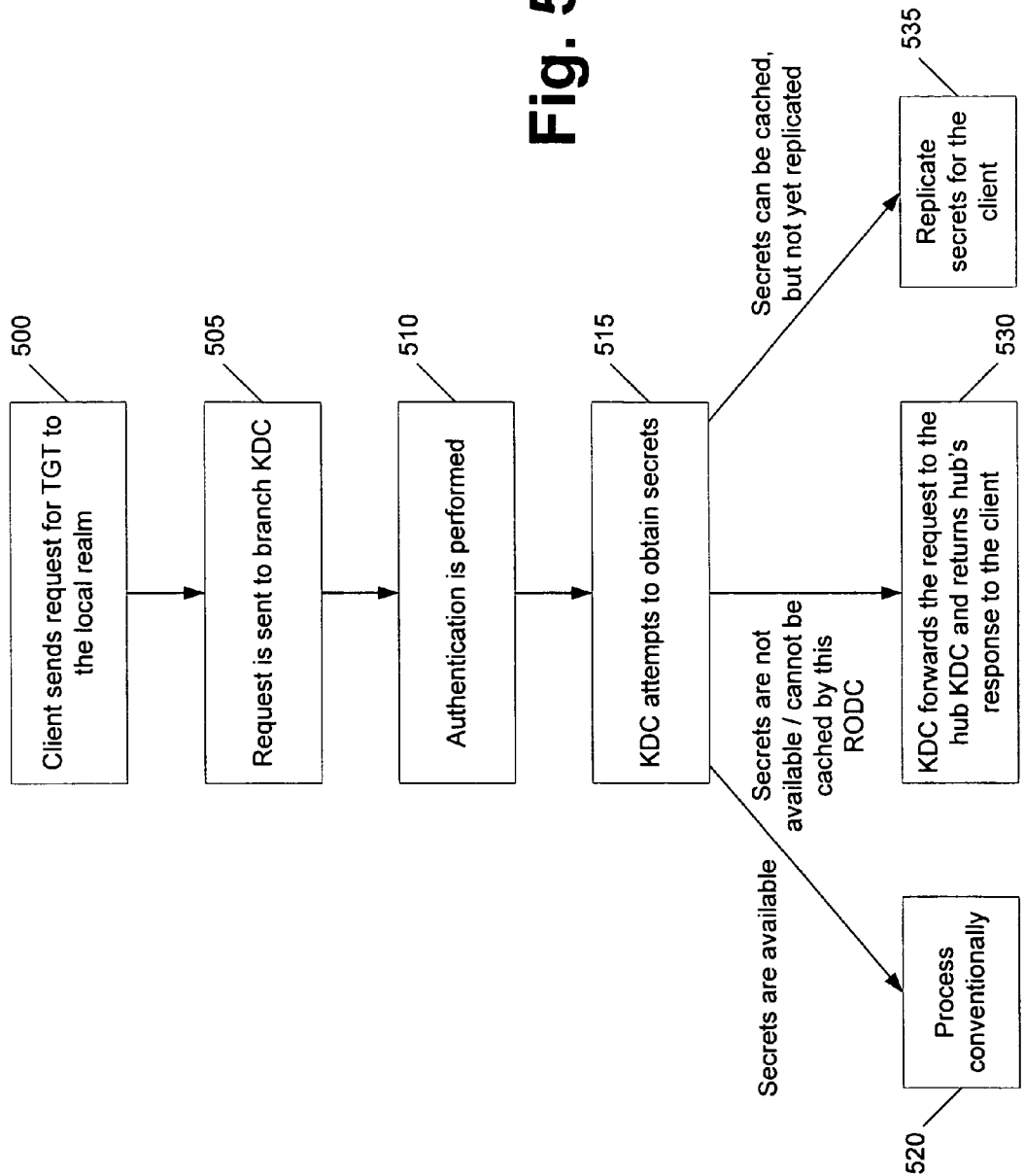
FIG. 5 is a flow diagram of an example method of processing an authentication request in accordance with the present invention.

FIG. 5 is a flow diagram of an example method of processing an authentication request client sends a request for a TGT to the local realm in accordance with the present invention. For processing a Kerberos authentication request, when a client sends a request for a TGT to the local realm (step 500), this request is sent to the branch KDC (step 505). At the branch DC, the AS_REQ is received. Password-based authentication is performed (step 510). When the KDC receives an AS_REQ, it will attempt to retrieve the user's key to decrypt the preauthorization information and to encrypt the AS_REP (step 515).

At this point, there are three possibilities:
1. The secrets are available for the target principal, this is the existing conventional code path and will stay as is (step 520).
2. The secrets are not available and cannot be cached by this branch DC. In this case, the KDC will know that it cannot handle this request and forwards the request as is to the hub KDC, and returns the hub DC's response to the client (step 530).
3. The account could be marked as cacheable, but the secrets have not been replicated yet. In this case, the KDC will still get the special return status, but in the process will replicate down the secrets for that user (step 535).

Figure 6:
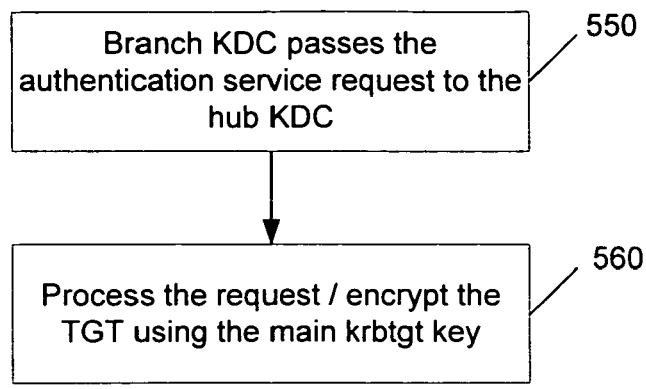
FIG. 6 is a flow diagram of an example method of processing an authentication request at a hub DC in accordance with the present invention.

FIG. 6 is a flow diagram of an example method of processing an authentication request at a hub DC in accordance with the present invention. At the hub DC, if the WAN is up, the branch KDC passes the AS_REQ request supplied by the client to the head office KDC (step 550). At the hub KDC, the request is processed in a conventional manner with the TGT being encrypted using the main krbtgt account key (step 560).

Figure 7:
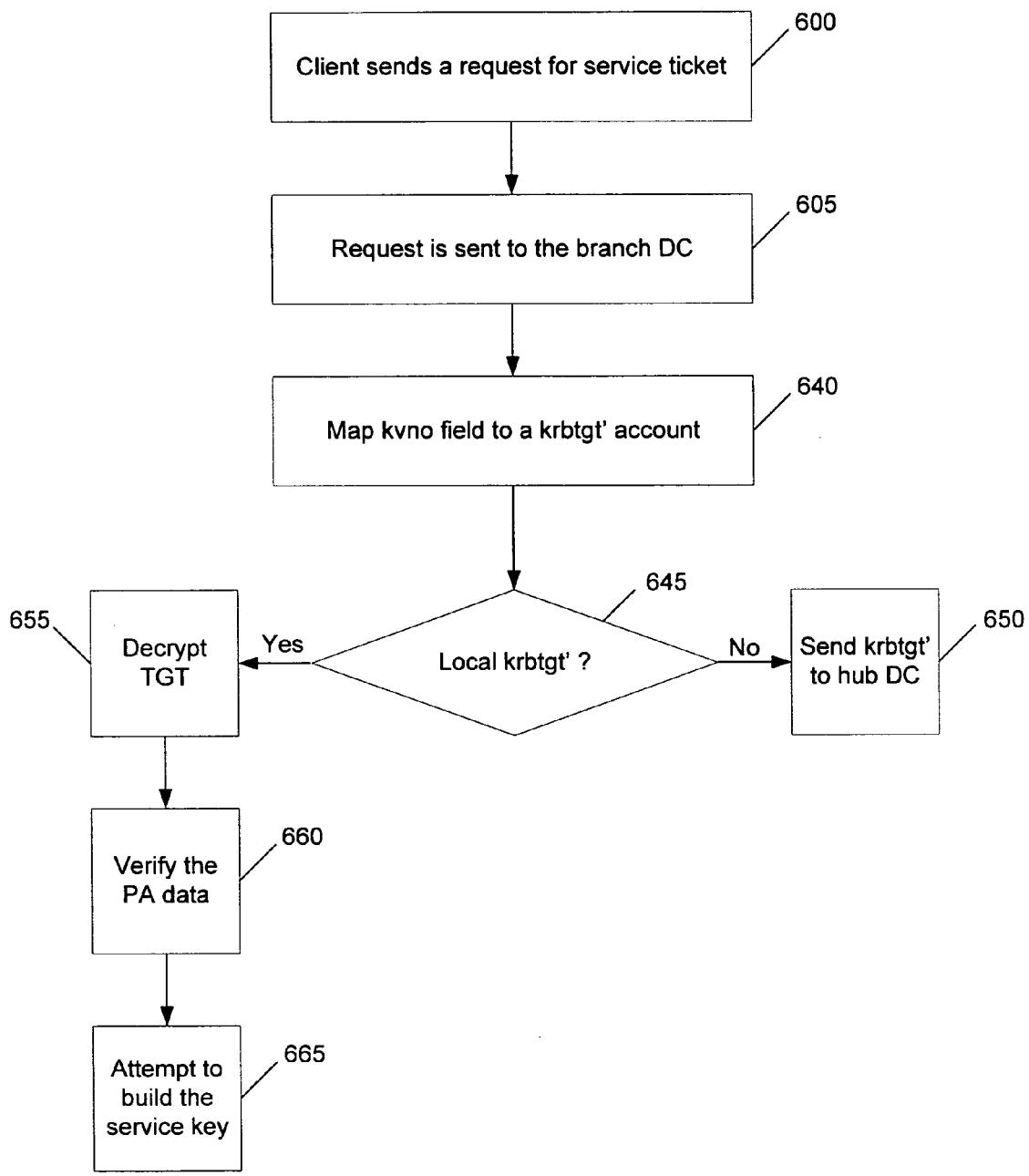
FIG. 7 is a flow diagram of another example method of processing an authentication request in accordance with the present invention.

FIG. 7 is a flow diagram of another example method of processing an authentication request when a client sends a request for a service ticket in accordance with the present invention. For processing a Kerberos authentication request, when a client sends a request for a service ticket (step 600), the request is sent to the branch KDC (step 605).

The "kvno" field is mapped to a krbtgt' account as described herein (step 640). If it is not the local krbtgt' (step 645), then it is forwarded to the hub DC (step 650), otherwise the local krbtgt' key is used to decrypt the TGT (step 655) and continue the code path (e.g., obtains the session key from it, decrypts the authenticator with the session to prove the validity of the request, obtains the service key to encrypt the service ticket in response).

After verifying the preauthentication (PA) data (step 660), the KDC attempts to build the service ticket (step 665). It attempts to retrieve the service key. If the service was determined to be in another domain, the KDC forwards the request to the hub DC. The KDC on the RODC cannot build cross-realm TGTs because of the lack of the trust keys.

If the service is not cached by this RODC, then the request is forwarded to the hub DC. If the secrets for the service are available, then KDC will continue as is and build the TGS_REP.

Figure 8:
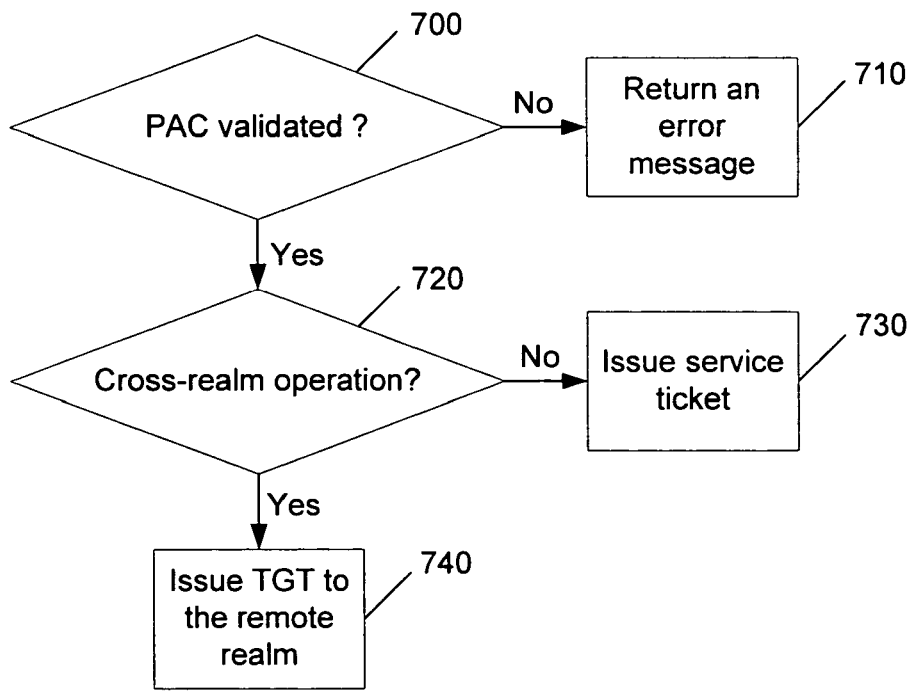
FIG. 8 is a flow diagram of another example method of processing an authentication request at a hub DC in accordance with the present invention.

FIG. 8 is a flow diagram of another example method of processing an authentication request at a hub DC in accordance with the present invention. Prior to issuing the service ticket or the cross realm ticket, the head KDC desirably examines and validates the PAC in the branch issued TGT (step 700). The PAC validation is desirably performed as follows. The account denoted by the primary user security ID (SID) claim is checked to determine if the user is a branch user. If the user is not a branch user, the group membership SID claims in the PAC are then recalculated.

At the hub KDC, it is determined if the operation is a cross-realm operation (step 720). If not, the hub KDC issues the service ticket (step 730), or in the case of cross realm operation, a TGT to the remote realm (740).

Regarding TGS_REQ on the hub DC, on TGS_REQ, the KDC decrypts the TGT, obtains the session key from it, and decrypts the authenticator with the session to prove the validity of the request. The service key is then obtained to encrypt the service ticket in response.

Handling the TGS_REQ is almost identical to how the KDC on the RODC will handle it, with the following exceptions:

1. if the TGT is a cross-realm TGT (example detection described above), the KDC will proceed to issue a service ticket.
2. if the TGT is encrypted with some krbtgt' key, then
    a. if the target service is a service that belongs to the same RODC that encrypted the TGT, then the KDC will proceed to issue the service ticket.
    b. If the target service is a service that does not belong to the same RODC encrypting the TGT, then the KDC will not use the PAC in the TGT and will issue a new one to use in the service ticket, then proceed to create the service ticket.

Example Computing Environment

Figure 9:
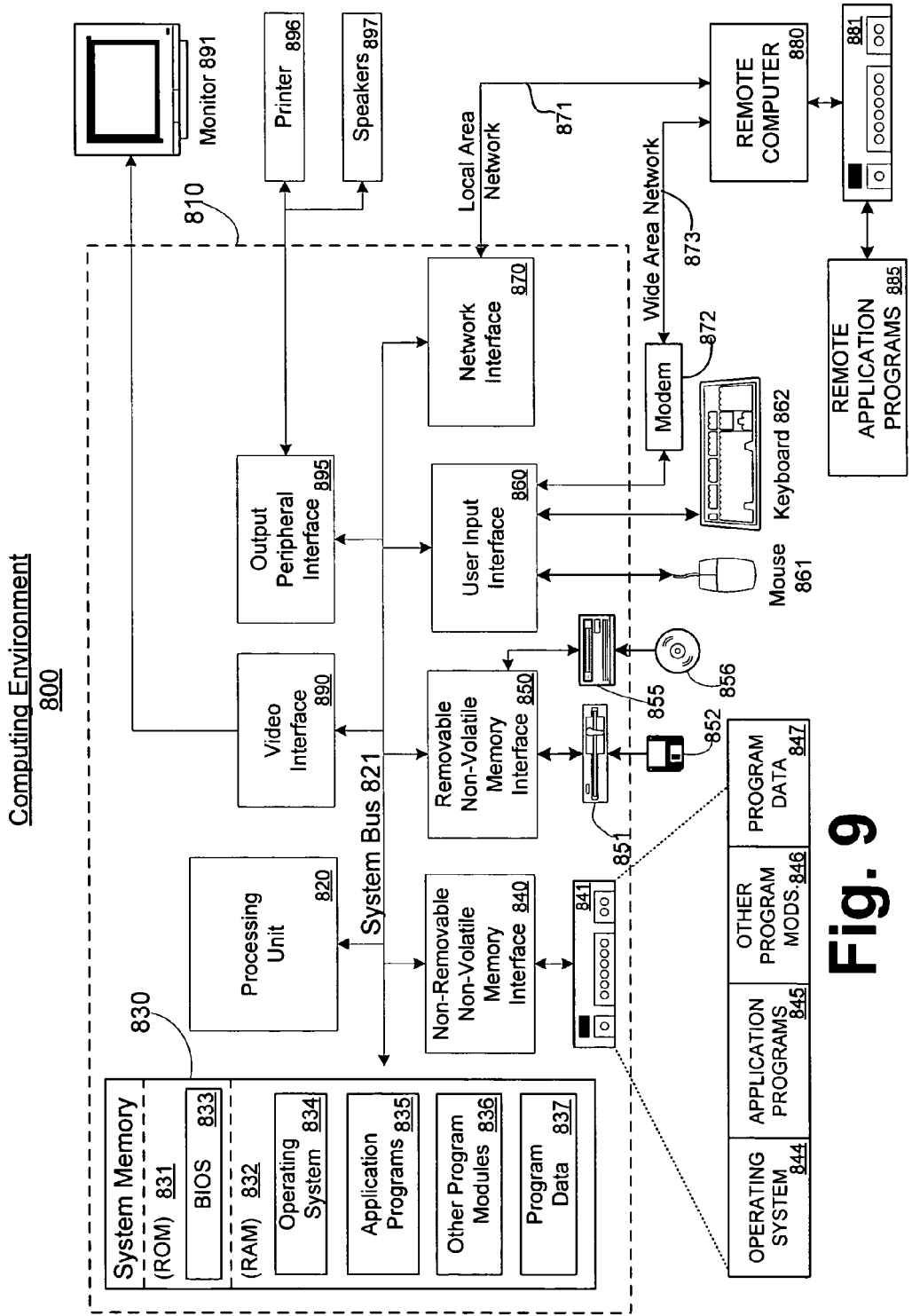
FIG. 9 is a block diagram showing an example computing environment in which aspects of the invention may be implemented.

FIG. 9 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 9 thus illustrates an example of a suitable computing system environment 800 in which the invention may be implemented, although as made clear above, the computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

With reference to FIG. 9, an example system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 830 includes computer storage media in the form of volatile and/or nonvolatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 9 provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 9. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on memory device 881. It will be appreciated that the network connections shown are exemplary and other means of establishing a communications link between the computers may be used.

One of ordinary skill in the art can appreciate that a computer 810 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A method for isolation within an authentication realm, comprising:
    maintaining a first key for a first group of users at a first site;
    maintaining a second key for a second group of users at a second site that is separate and isolated from the first site;
    maintaining the first key for the first group, the second key for the second group, and a master key at a primary site;
    and performing one of authentication at the first site using the first key and authentication at the second site using the second key while appearing to a client to authenticate against a single realm,
    wherein authentication using one of the first key at the first site and the second key at the second site makes data access privileges available to the client in the single realm that are more limited than data access privileges made available by authenticating with the master key.

2. The method of claim 1, further comprising performing authentication at the primary site if performing authentication at one of the first site and the second site fails.

3. The method of claim 1, wherein the first site comprises a first branch domain controller (DC) and the second site comprises a second branch DC, and the primary site comprises a primary DC and a hub DC.

4. The method of claim 3, wherein the hub DC is associated with a head office.

5. The method of claim 1, wherein the primary site is in one way replication communication with each of the first and second sites.

6. The method of claim 1, wherein the primary site is a Kerberos realm, and the first site comprises a first Kerberos sub-realm, and the second site comprises a second Kerberos sub-realm, wherein each of the first site, the second site, and the primary site have an associated key distribution center (KDC), the KDC for the first and second sites using a different type of key for ticket granting ticket signing and encrypting than the KDC for the primary site.

7. The method of claim 1, comprising:
    storing user data at the primary site, the user data including a first set of secret user data associated with the first group of users at the primary site, and the user data including a second set of secret user data associated with the second group of users at the primary site; and
    replicating a portion of the user data to the first and second sites,
    wherein the first set of secret user data is excluded from being replicated to the second site based on authentication of the second site using the second key, and
wherein the second set of secret user data is excluded from being replicated to the first site based on authentication of the first site using the first key.

8. The method of claim 7, wherein the type of key used by the KDC for the first and second sites is a krbtgt' password type and the type of key used by the KDC for the primary site is a krbtgt password type.

9. A system for isolation within an authentication realm, comprising:
    a first site having an associated key for an associated first group of users for making a first set of data access privileges available to the first group of users in a single realm and at the first site;
    a second site having an associated key for an associated second group of users for making a second set of data access privileges available to the second group of users in the single realm and at the second site, the second site being separate and isolated from the first site; and
    a primary site that maintains the keys for the first and second groups and a master key, wherein the data access privileges made available using the associated key for one of the associated first group of users and the associated second group of users are more limited than data access privileges made available by authenticating with the master key.

10. The system of claim 9, wherein the first site comprises a first branch domain controller (DC) and the second site comprises a second branch DC, and the primary site comprises a primary DC and a hub DC.

11. The system of claim 10, wherein the hub DC is associated with a head office.

12. The system of claim 9, wherein the primary site is in one way replication communication with each of the first and second sites.

13. The system of claim 9, wherein the primary site is a Kerberos realm, and the first site comprises a first Kerberos sub-realm, and the second site comprises a second Kerberos sub-realm, wherein each of the first site, the second site, and the primary site have an associated key distribution center (KDC), the KDC for the first and second sites using a different type of key for ticket granting ticket signing and encrypting than the KDC for the primary site.

14. The system of claim 9, wherein the primary site stores user data, the user data including a first set of secret user data associated with the first group of users at the primary site, and the user data including a second set of secret user data associated with the second group of users at the primary site; and
    wherein the primary site replicates a portion of the user data to the first and second sites,
    wherein the first set of secret user data is excluded from being replicated to the second site based on authentication of the second site using the second key, and
wherein the second set of secret user data is excluded from being replicated to the first site based on authentication of the first site using the first key.

15. The system of claim 14, wherein the type of key used by the KDC for the first and second sites is a krbtgt' password type and the type of key used by the KDC for the primary site is a krbtgt password type.

16. The system of claim 9, the first and second site each have an account comprising a field having a first word identifying a key version number and a second word identifying a key used to encrypt a ticket granting ticket.

17. The system of claim 16, wherein the account for the first site can only be shared with domain controllers associated with the first site, and the account for the second site can only be shared with domain controllers associated with the second site.

18. A computer-readable storage medium having stored thereon a data structure and program code that, when executed by a computing environment, causes the computing environment to:

maintain a data structure comprising:
   a first data field containing data representing a key version number; and
   a second data field containing data representing a key used to encrypt a ticket granting ticket; and perform authentication using the data structure, wherein the authentication makes data access privileges available to a client that are more limited than data access privileges made available by authenticating with a master key.

19. The computer-readable storage medium of claim 18, wherein the key version number is associated with branch domain controllers.

20. The computer-readable storage medium of claim 18, wherein the second data field is used by a hub key distribution center to determine what key was used by a branch domain controller to encrypt the ticket granting ticket.

* * * * *